United States Patent [19]

Jasim et al.

[11] Patent Number: 5,716,528
[45] Date of Patent: Feb. 10, 1998

[54] PEROXIDE WATER TREATMENT PROCESS

[75] Inventors: Khalid Salman Jasim, Pierrefonds; Neil G. Richardson, Saint Laurent, both of Canada

[73] Assignee: Domtar Inc., Canada

[21] Appl. No.: 540,670

[22] Filed: Oct. 11, 1995

[51] Int. Cl.$^6$ .................... C02F 1/28; C02F 1/72
[52] U.S. Cl. .............. 210/668; 210/669; 210/759; 210/909; 210/763
[58] Field of Search .................. 210/909, 759, 210/763, 762, 668, 669, 908

[56] References Cited

U.S. PATENT DOCUMENTS

| | | | |
|---|---|---|---|
| 4,294,703 | 10/1981 | Wilms et al. | 210/631 |
| 4,340,490 | 7/1982 | Junkermann et al. | 210/759 |
| 4,804,480 | 2/1989 | Jayawant | 210/917 |
| 5,039,416 | 8/1991 | Loew et al. | 210/631 |
| 5,043,080 | 8/1991 | Cater et al. | 210/748 |
| 5,156,748 | 10/1992 | Meunier et al. | 210/759 |
| 5,232,484 | 8/1993 | Pignatello | 588/206 |
| 5,286,141 | 2/1994 | Vigneri | 405/128 |
| 5,356,539 | 10/1994 | Peter et al. | 210/909 |
| 5,520,483 | 5/1996 | Vigneri | 405/128 |
| 5,525,008 | 6/1996 | Wilson | 405/128 |
| 5,575,919 | 11/1996 | Santina | 210/695 |

OTHER PUBLICATIONS

Hugh R. Eisenhauer, Journal WPCF, vol. 38, No. 9, pp. 1116–1128 (Sep. 1964).

The Oxidation of Aromatic Compounds by Means of the Free Hydroxyl Radical, Merz et al 1949, pp. 2427–2432.

Water Environment Research, vol. 64, No. 5, pp. 682–690, Sang H. Lee et al (Aug. 1992).

Environ. Sci. Technol., vol. 25, No. 4, 1991, pp. 777–782, D. L. Sedlak et al.

Environ. Sci. Technol., vol. 25, No. 8, 1991, pp. 1419–1426, D. L. Sedlak et al.

Chemosphere, vol. 16, Nos. 10–12, pp. 2225–2237, 1987, E. Borgarello et al.

Technical Bulletin, H7–156(Aug. 1990), "The Oxidation of Total Phenols with Catalized Hydrogen Peroxide".

Hydrogen Peroxide, Technical Data Sheet 7H–156(Sep. 1992), "The Oxidation of Total Phenols with Catalyzed Hydrogen Peroxide".

Hydrogen Peroxide, Technical Data Sheet 7H–214(Sep. 1992), "Fenton's Reagent".

Primary Examiner—Cynthia L. Nessler
Attorney, Agent, or Firm—Bachman & LaPointe, P.C.

[57] ABSTRACT

Aromatic organic contaminants in waste water efficiently removed by oxidizing the contaminants with hydrogen peroxide in the presence of a catalytic amount of ferrous ions, at an acid pH, to produce an oxidized water which may be passed through activated carbon to adsorb residual organic contaminants; the process is especially useful for treatment of contaminated water derived from a wood preservation treatment and containing polyaromatic hydrocarbons and phenols and/or chlorinated phenols.

11 Claims, 1 Drawing Sheet

PEROXIDE WATER TREATMENT PROCESS

BACKGROUND OF INVENTION i) Field of the Invention

This invention relates to a process for removing organic contaminants from contaminated water; more especially to a process for removing organic contaminants from a contaminated water derived from a wood preservation treatment.

ii) Description of Prior Art

Preservation of wood typically involves treatment of the wood with aromatic organics, for example, creosote or chlorinated phenols such as pentachlorophenol, and is widely employed when the wood is to be used in such products as railway ties, telephone poles and marine pilings.

Such preservation treatment generates waste water contaminated with the aromatic organics, which waste water requires treatment to remove the contaminants so that the contaminants do not invade the environment.

One known treatment involves mechanical separation of free oil, coagulation and flocculation of emulsified oil and adsorption of organics on activated carbon.

The activated carbon removes the dissolved organic contaminants. The activated carbon must be replaced regularly as it becomes saturated with the organic contaminants. The regular replacement of the activated carbon represents a significant cost and regeneration can be difficult in view of the nature of the contaminants.

It is also necessary in some areas to treat ground water developed from past discharges of such contaminated waste water into the environment, which ground water may contain unacceptable levels of the aromatic organics.

Eisenhauer H. R., Water Pollution Control Federation Journal, Vol. 36, No. 9, September 1964, "Oxidation of Phenolic Wastes", page 1116–1128 describes the use of Fenton's reagent, i.e., ferrous iron salt and hydrogen peroxide, for oxidation of phenol in different waste waters, and expressly teaches that in the case of substituted phenols the greater the degree of substitution, the slower is the oxidation reaction and that no oxidation reaction occurred when all available positions were blocked or substituted as in pentachlorophenol. In the case of phenol oxidation Eisenhauer teaches that optimum results are achieved when the reaction employs one mole of ferrous salt and three moles of hydrogen peroxide per mole of phenol.

SUMMARY OF THE INVENTION

It is an object of this invention to provide a process for removing organic contaminants from contaminated Water, especially a contaminated water derived from a wood preservation treatment.

In accordance with the invention there is provided a process for removing organic contaminants from contaminated water comprising: oxidizing the contaminants in the contaminated water with hydrogen peroxide in the presence of a catalytic amount of ferrous ions, at an acid pH, to produce an oxidized water, said contaminants comprising polynuclear aromatic hydrocarbons and at least one aromatic organic contaminant selected from the group consisting of phenols and chlorinated phenols.

Optionally the oxidized water is passed through activated carbon to adsorb residual organic contaminants.

DESCRIPTION OF PREFERRED EMBODIMENTS i) Contamination

Wood preservation typically involves impregnating the wood with creosote or chlorinated phenols such as pentachlorophenol.

Creosote is a mixture of polynuclear aromatic hydrocarbons, for example, naphthalene and anthracene and also contains phenols chiefly phenol and methylphenols.

In a typical wood preserving plant the process water generated due to treatment of wood with pentachlorophenol, creosote or both is between 500,000 and 3 million gallons per year.

The contaminated water which is to be treated may be newly generated waste water from the preservation treatment of wood, or it may be a ground water contaminated from wood preserving operations. Contamination of ground water with phenols and polyaromatic hydrocarbons may also arise at tar distillation plants.

As a result of increased knowledge of possible hazards of contaminating organics in the environment, as well as social, political and legal requirements, it is necessary in some cases to treat ground water.

Such ground water may be relatively clean, as compared with newly generated waste water, but may still contain an unacceptably high level of organic contaminants.

ii) Oxidation

In accordance with the invention oxidation of the organic contaminants in the contaminated water is achieved with hydrogen peroxide in the presence of ferrous ions, at an acid pH. The ferrous ions function as a catalyst.

The weight ratio of hydrogen peroxide, to (COD) Chemical Oxygen Demand is suitably at least 0.9:1, more suitably at least 1.2:1, preferably at least 1.25:1, and the concentration of ferrous ions is suitably about 5% to about 7%,.preferably about 6%, by weight, based on the weight of hydrogen peroxide.

The oxidation is carried out at an acid pH suitably about 2 to about 4, and in particular at pH of about 3 to about 4.

It is further found that the best results are achieved at elevated temperatures of the order of about 40° C., in that the rate of oxidation is higher at such elevated temperatures as compared with ambient temperatures of 15° to 18° C., although there is a small loss of hydrogen peroxide due to thermal decomposition, at such elevated temperatures.

In cases where the waste water is highly contaminated such as with newly generated waste water so that relatively high concentrations of hydrogen peroxide, and thus of $Fe^{2+}$ ion are required, it is appropriate to adjust the pH of the oxidized waste water, after completion of the oxidation, to a pH of at least 7 and preferably at least 8 to precipitate the iron catalyst from the contaminated water, prior to the optional adsorption on activated carbon.

In the case of ground water, where the content of organic contaminants is lower, the precipitation of iron may not be necessary.

When a large volume of waste water is treated an antifoaming agent, for example, Dow Corning 1430 (Trade Mark) antifoam, is suitably employed in an antifoaming amount up to 50 ppm of the waste water.

It is found that the oxidation treatment of the invention with hydrogen peroxide will typically reduce the COD of the waste water by about 88%, the organic chloride by 97% and the polynuclear aromatic hydrocarbons by 98%.

iii) Activated Carbon

The oxidized water, optionally after precipitation of the catalytic ferrous ions is preferably fed through a bed of granular activated carbon. Typically the activated carbon may be contained in one or more columns or towers through which the oxidized waste water flows.

iv) Pretreatment

The contaminated water may be subjected to preliminary cleaning operations to remove other contaminants, including gravity separation of non-emulsified oil, flocculation to remove emulsified oils and filtration through a sand bed.

Figure 1:
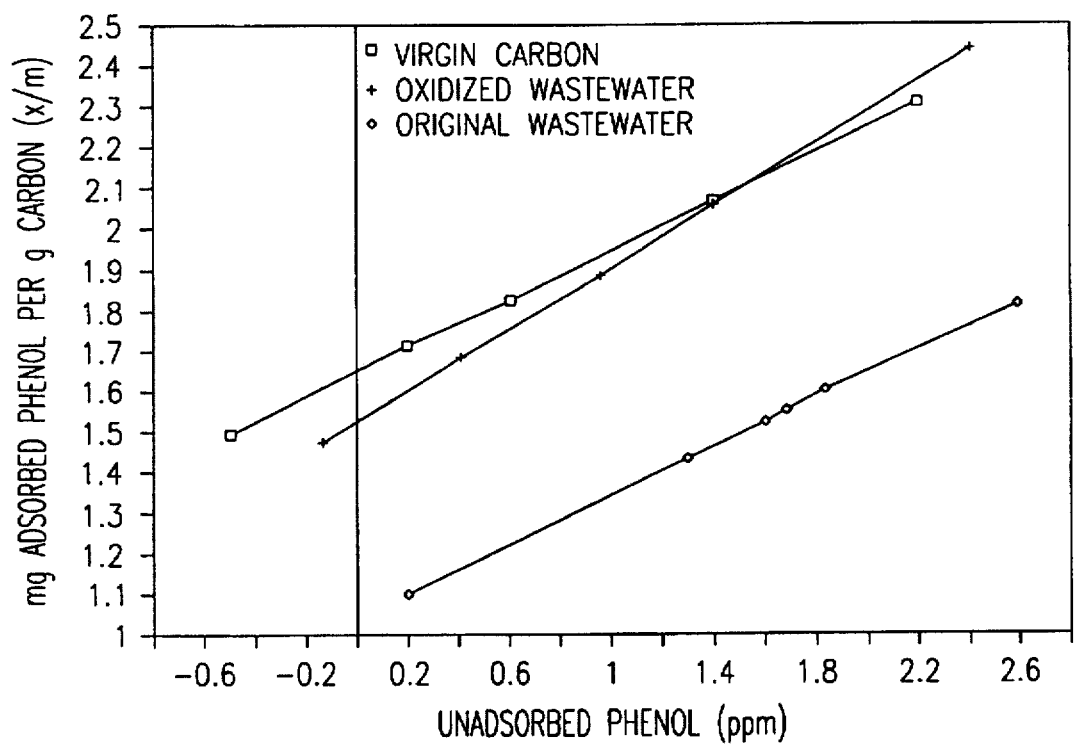
FIG. 1 is a plot demonstrating the increased service life of carbon by employing the process of the invention.

The invention is further explained by reference to the following Examples; in the tables accompanying the Examples pentachlorophenol is sometimes referred to as PCP or simply penta.

EXAMPLES

Example 1 a) Oxidation of pentachlorophenol, pH effect

A synthetic pentachlorophenol solution was prepared by dissolving an appropriate amount of technical grade pentachlorophenol in deionized water. The pH of the solution was kept at 8 to 9 with 5% sodium hydroxide solution. The pentachlorophenol concentration was 18.7 ppm as determined by a standard GC/MS method.

100 ml of the above solution was placed in each of seven 100 ml beakers.

The temperature of each solution was kept at 40° C.±2°.

900 mg $H_2O_2$ (2.37 ml of 35% solution) and 27 mg of $Fe^{2+}$ (4.84 ml 0f 0.1 molar ferrous sulphate heptahydrate solution) were added, respectively, to each beaker.

The pH values of the above solutions were adjusted to 2.6, 2.8, 3.6, 4.5, 5.3, 9.5 and 11.6, respectively, immediately after the addition of the ferrous sulphate solution.

After 3 hours of continuous gentle stirring, the pH of each solution was adjusted to 8.5 and the solutions were analyzed for pentachlorophenol.

The results of this experiment are presented in Table 1 and show that the best oxidation results were achieved at a pH below 4. At pH 4.5 and higher, increasing levels of pentachlorophenol were observed b) Oxidation of phenol, pH effect A similar procedure as in Example 1a) was followed employing phenol.

A phenol solution having a phenol concentration of 100 ppm was prepared.

To each of four 160 ml samples of the phenol solution were added 23.7 ml of 35% peroxide and 48.4 ml of 0.1M ferrous sulfate heptahydrate, respectively.

The pH values were adjusted to 3.5, 7.0, 9.0 and 11.6.

After 3 hours of gentle mixing, the pH of each reaction mixture was adjusted to 8.5 and analyzed for phenol.

The experimental results given in Table 2 again show that the best oxidation results were achieved at a pH below 4; a significant increase in the level of phenol was observed at higher pH.

Example 2 a) Effect of peroxide/penta weight ratios on the oxidation of pentachlorophenol

Appropriate amounts of technical grade pentachlorophenol were dissolved in deionized water (the pH of which was kept at 8 to 9 with 5% NaOH solution) to yield solutions containing 19.0, 38.1, 66.6 and 76.2 ppm pentachlorophenol.

100 ml of each of the above solutions was placed in each of four 100 ml beakers.

The temperature of each solution was kept at 40° C.±2°.

157.5 mg $H_2O_2$ (≈0.42 ml of 35% solution) were added to each beaker to give peroxide/penta weight ratios of 82.7, 41.3, 27.6 and 20.7, respectively.

4.74 mg of $Fe^{2+}$ (≈0.85 ml of 0.1 molar solution of ferrous sulphate heptahydrate) were then added to give a constant $Fe^{2+}/H_2O_2$ weight ratio of 3% in each beaker.

The pH of each solution was adjusted to 3.5 immediately after the addition of the ferrous sulphate solution.

After 3 hours of gentle stirring, the pH of each solution was adjusted to 8.5 and the products were analyzed for pentachlorophenol.

The results in Table 3 indicate that the greatest degrees of destruction of pentachlorophenol were achieved at a peroxide/pentachlorophenol weight ratio of at least 27:1.

b) Effect of peroxide/phenol weight ratios on the oxidation of phenol in synthetic samples A synthetic phenol solution was prepared by dissolving an appropriate amount of phenol in deionized water. The phenol concentration was 1000 ppm as determined by standard procedures.

100 ml of the above solution was placed in each of three 100 ml beakers.

The temperature of each solution was kept at 40° C.±2°.

150, 200 and 300 mg $H_2O_2$ were added to the above three beakers to give peroxide/phenol weight ratios of 1.5, 2 and 3, respectively.

≈0.81 ml of 0.1 molar ferrous sulphate heptahydrate solution containing 4.5 mg of $Fe^{2+}$ were then added to each beaker.

The pH of each solution was adjusted to 3.5 immediately after the addition of the ferrous sulphate solution.

After 3 hours of gentle agitation, the pH of each solution was adjusted to 8.5 and the products were analyzed for phenol.

The results depicted in Table 4 show that the best results in terms of low residual phenol were achieved at a peroxide/phenol weight ratio of at least 3:1.

Example 3

Effect of Ferrous Iron as Percent (w/w) of Peroxide on the Oxidation of Pentachlorophenol in Synthetic Samples Hydrogen peroxide (181.5 mg) was added to eleven 100 ml portions of a solution containing 57 ppm of pentachlorophenol to give a peroxide:penta-chlorophenol ratio of 32 in each sample. Ferrous sulphate heptahydrate solution (0.1 molar) was then added so that the $Fe^{2+}$ levels in the various samples were 0.3, 0.6, 1.2, 1.8, 2.5, 2.9, 3.9, 5, 6.3, 9.5 and 12.7 percent relative to the peroxide level (w/w). The pH values were then adjusted to 3.5.

After 3 hours of gentle stirring at 40° C., the pH of each solution was adjusted to 8.5 and the samples were analysed. The results in Table 7 show that the minimum amount of $Fe^{2+}$ required should be 5% w/w of the total peroxide used.

Example 4

Effect of Ferrous Iron as Percent (w/w) of Peroxide on the Oxidation of Phenol in Synthetic Samples Hydrogen peroxide (300 mg) was added to six 100 ml portions of a solution containing 1000 ppm of phenol to give a peroxide:phenol ratio of 3.0 in each sample. Ferrous sulphate heptahydrate solution (0.1 molar) was then added so that the $Fe^{2+}$ levels in the various samples were 0.5, 0.9, 1.5, 3.7, 50 and 100 percent relative to the peroxide level (w/w). The pH values were then adjusted to 3.5. After 3 hours of gentle stirring at 40° C., the pH of each solution was adjusted to 8.5 and the samples were analysed for phenol.

The results in Table 8 show that oxidation of phenol is effective when ferrous iron is used at 0.5 to 3.7 percent relative to peroxide on a weight basis, provided that the minimum peroxide/phenol weight ratio is 3/1.

Example 5 a) Effect of catalyst concentration 100 ml samples of waste water (containing 22.2 ppm pentachlorophenol, 67.2 phenol and 1685 ppm COD) were placed in five 100 ml beakers and kept at 40°±2° C.

210 mg of peroxide (≈0.55 ml of 35% solution) was added to each beaker.

Ferrous sulphate heptahydrate 0.1M solutions equivalent to 20.2, 15.07, 10.04, 5.02 and 2.51 ppm $Fe^{2+}$ were added each to a separate beaker.

The pH of each beaker was adjusted to 3.5 and the solutions were mixed gently for three hours, after which time the pH of each solution was adjusted to 8.5±0.4 and analyzed for pentachlorophenol and phenols.

The results in Table 5 suggest that the best concentration of the catalyst lies in the range 4.8–9.6% w/w $Fe^{2+}/H_2O_2$, for oxidation of phenol and pentachlorophenol.

b) Effect of peroxide/COD weight ratio 100 ml samples of waste water (containing 22.2 ppm pentachlorophenol, 67.2 phenol and 1685 ppm COD) were placed in seven 100 ml beakers and kept at 40°±2° C.

Hydrogen peroxide solutions equivalent to 50, 75, 100, 150, 175, 200 and 210 mg were added each to a separate beaker.

Ferrous sulphate heptahydrate 0.1 M solution equivalent to 15.07 mg $Fe^{2+}$ was added to each beaker.

The pH of each beaker was adjusted to 3.5 and the solutions were mixed gently for three hours.

After that time, the pH of each solution was adjusted to 8.5 and analyzed for pentachlorophenol and phenol.

The information reported in Table 6 shows that the best result was achieved at a weight ratio of approximately 1.3:1 peroxide/COD. At lower weight ratios the residual pentachlorophenol was higher.

Example 6

Destruction of Polyaromatic Hydrocarbons

In field trials 900 liter samples of wood preserving wastewater of known Chemical Oxygen Demand (COD) was treated as follows:

400 ml of a 25% well mixed solution of Dow14 Corning 1430 (Trade Mark) antifoam was added to obtain a maximum of 50 ppm of the antifoam in the process water. This antifoam agent was added because foaming was expected in view of the large volume of waste water being treated.

An amount of $H_2O_2$ equivalent to 1.25–1.5 times the COD by weight was added below the water surface.

An amount of $Fe^{2+}$ (as 0.1M or 1M ferrous sulphate heptahydrate) equivalent to 5–7% of the total $H_2O_2$ by weight was added with fast agitation. The pH was kept at 3–3.8 at a temperature of 40°±5° C.

The reaction was judged complete when the colour of the reaction mixture turned light yellow similar to that of a ferric ions solution (3–3.5 hrs.)

The catalyst was separated by co-precipitation with alum or poly electrolytes.

The process parameters are set out hereinafter.

| CONDITIONS AND PARAMETERS | EXPERIMENT # | | | |
|---|---|---|---|---|
| | 1 | 2 | 3 | 4 |
| VOL. (l) | 900 | 900 | 900 | 900 |
| COD (ppm) | 1586 | 1832 | 3273 | 750 |
| PEROXIDE (50%), l | 3.570 | 4.122 | 8.84 | 2.025 |
| PEROXIDE/ COD (W/W) | 1.25 | 1.25 | 1.5 | 1.5 |
| CATALYST, $Fe^{2+}$ (0.5M), (l) | 4 | 4.75 | 9.5 | 2.18 |
| $Fe2^+$/ PEROXIDE W/W | 0.06 | 0.06 | 0.06 | 0.06 |
| REACTION pH | 3–3.5 | 3–3.5 | 3–3.5 | 3–3.5 |
| REACTION TIME (HRS) | 3–3.5 | 3–3.5 | 3–3.5 | 3–3.5 |

In this field trial, the extent of removal of organics from process water after the catalytic peroxide-oxidation as shown in Table 9 was significant. In most cases, over 80% of the chemical oxygen demand was removed.

Table 10 shows an almost complete destruction of adsorbable organic halogens. The removal of chlorinated organic compounds is necessary to eliminate the possibility of forming dioxins and furans during the regeneration of exhausted activated carbon.

Tables 11–13 indicate that >99.91% of total phenols were removed after oxidation only, whereas >99.97% were removed after oxidation followed by carbon adsorption. In addition, 92.60–98.75% of pentachlorophenol was removed after oxidation only, whereas >99.3% was removed after oxidation and carbon adsorption.

The removal of polyaromatic hydrocarbons, (see Tables 14–16) was significant. A reduction of 96.9–99.95% (except for naphthalene) after oxidation only and 99.6–99.95% after oxidation and adsorption was obtained.

Example 7

Carbon Adsorption Capacity

Flocculated waste water, and some flocculated water after oxidation were passed through two carbon columns operating in parallel.

The carbon columns were 12 cm long by 3.5 cm diameter and each contained 50 grams of carbon (−14 to +20 mesh). The flow rate was 4 ml/min. The breakthrough point (this was defined as the point at which the level of phenol in the effluent was 50% of that in the in-feed) was reached on the column processing the waste water, after flocculation, after the passage of 16.3 liters.

The same volume (16.3 liters) of oxidized water was passed through the other column.

The carbon from each column was then recovered, air-dried and mixed thoroughly. Phenol adsorption isotherms were then constructed for each carbon and compared with that of virgin carbon.

FIG. 1 shows the phenol adsorption isotherms of fresh carbon, carbon treated with 16.3 liters of unoxidised waste water and carbon treated with 16.3 liters of oxidized waste water. The carbon treated with unoxidized water was almost exhausted, whereas carbon treated with oxidized water shows a very small reduction in its adsorption capacity. This indicates that the carbon service life could be increased significantly after oxidizing the waste water.

Example 8

Oxidation of Groundwater

A 1 liter sample of groundwater from a former wood preserving plant was oxidised using an amount of hydrogen peroxide equal to 1.25 times the COD content of 250 ppm. The amount of ferrous iron used was 6.0% (w/w) of the amount of hydrogen peroxide. After a reaction time of 60 minutes at 14° C., the pH was adjusted to 8.0 and the product was analysed. The results are shown in Table 17.

TABLE 1

EFFECT OF pH ON PENTA OXIDATION BY PEROXIDE

| parameter | value | | | | | | |
|---|---|---|---|---|---|---|---|
| penta before reaction (ppm) | 18.7 | 18.7 | 18.7 | 18.7 | 18.7 | 18.7 | 18.7 |
| pH | 2.6 | 2.8 | 3.6 | 4.5 | 5.3 | 9.5 | 11.6 |
| penta after reaction (ppm) | 0.02 | 0.02 | 0.02 | 1.38 | 1.5 | 17.4 | 17.4 |

1. Reaction conditions:
sample volume (ml) = 100
conc. of peroxide (ppm) = = 9000
conc. of ferrous ions (ppm) = 270
reaction temperature (°C.) = 40
reaction time (hrs) = 3 (for almost complete colour removal)
catalyst separation = precipitation with NaOH

TABLE 2

EFFECT OF pH ON PHENOL OXIDATION BY PEROXIDE

| parameter | value | | | |
|---|---|---|---|---|
| phenol before reaction (ppm) | 100 | 100 | 100 | 100 |
| pH | 3.6 | 7 | 9 | 11.6 |
| phenol after reaction (ppm) | <0.02 | 60 | 75 | 75 |

1. Reaction conditions were:
sample volume (ml) = 100
conc. of peroxide (ppm) = 9000
conc. of ferrous ions (ppm) = 270
reaction temperature (°C.) = 40
reaction time (hrs) = 3 (for almost complete colour removal)
catalyst separation = precipitation with NaOH

TABLE 3

EFFECT OF $H_2O_2$/PCP RATIO ON THE OXIDATION OF PCP IN SYNTHETIC SAMPLES

| PCP (ppm) | $H_2O_2$ (ppm) | $Fe^{2+}$ (ppm) | $H_2O_2$/PCP ratio | $Fe^{2+}$/$H_2O_2$ % | PCP destruction (%) |
|---|---|---|---|---|---|
| 19.0 | 1575 | 47.4 | 82.7 | 3 | 96.2 |
| 38.1 | 1575 | 47.4 | 41.3 | 3 | 98.2 |
| 66.6 | 1575 | 47.4 | 27.6 | 3 | 98.9 |
| 76.2 | 1575 | 47.4 | 20.7 | 3 | 95.9 |

TABLE 4

EFFECT OF $H_2O_2$/PHENOL RATIO ON THE OXIDATION OF PHENOL

| Exp.# | Phenol conc. (ppm) | Peroxide conc. (ppm) | $Fe^{2+}$ conc. (ppm) | Peroxide/phenol ratio | $Fe^{2+}$/$H_2O_2$ (% w/w) | Residual phenol (ppm) |
|---|---|---|---|---|---|---|
| 1 | 1000 | 3000 | 45 | 3:1 | 1.5 | <0.02 |
| 2 | 1000 | 1500 | 45 | 1.5:1 | 3 | 100 |
| 3 | 1000 | 2000 | 45 | 2:1 | 2.25 | 40 |

TABLE 5

OPTIMIZATION OF THE REACTION CONDITIONS FOR THE OXIDATION OF PROCESS WATER FROM WOOD PRESERVING PLANT
EFFECT OF CATALYST CONCENTRATION

| PCP ppm | 22.2 | 22.2 | 22.2 | 22.2 | 22.2 | 22.2* |
|---|---|---|---|---|---|---|
| phenol ppm | 67.2 | 67.2 | 67.2 | 67.2 | 67.2 | 67.2 |
| COD ppm | 1684 | 1684 | 1684 | 1684 | 1684 | 1684 |
| $H_2O_2$ ppm | 2100 | 2100 | 2100 | 2100 | 2100 | 2100 |
| $Fe^{2+}$ ppm | 202 | 150.7 | 100.4 | 50.2 | 25.1 | 150 |
| $H_2O_2$/COD | 1.3 | 1.3 | 1.3 | 1.3 | 1.3 | 1.3 |
| $Fe^{2+}$ as % (w/w) of $H_2O_2$ | 9.6 | 7.2 | 4.8 | 2.4 | 1.2 | 7.1 |
| residual phenol (ppm) | <0.02 | <0.02 | <0.02 | <0.02 | <0.02 | >50 |
| residual PCP (ppm) | 0.04 | 0.02 | 0.04 | 3.1 | 3.0 | >20 |

*This experiment was carried out at pH 11.5 to confirm that PCP (like phenols) does not oxidize at high pH.

TABLE 6

OPTIMIZATION OF THE REACTION CONDITIONS FOR THE OXIDATION OF PROCESS WATER FROM A WOOD PRESERVING PLANT
EFFECT OF PEROXIDE/COD RATIO

| PCP ppm | 22.2 | 22.2 | 22.2 | 22.2 | 22.2 | 22.2 | 22.2 |
|---|---|---|---|---|---|---|---|
| phenols ppm | 67.2 | 67.2 | 67.2 | 67.2 | 67.2 | 67.2 | 67.2 |
| COD ppm | 1685 | 1685 | 1685 | 1685 | 1685 | 1685 | 1685 |
| $H_2O_2$ ppm | 500 | 750 | 1000 | 1500 | 1750 | 2000 | 2100 |
| $Fe^{2+}$ ppm | 150.7 | 150.7 | 150.7 | 150.7 | 150.7 | 150.7 | 150.7 |
| $H_2O_2$/COD | 0.3 | 0.45 | 0.6 | 0.9 | 1.04 | 1.19 | 1.3 |
| $Fe^{2+}$ as % (w/w) of $H_2O_2$ | 30.1 | 20.1 | 15.1 | 10.05 | 8.6 | 7.5 | 7.2 |
| residual phenol (ppm) | <0.02 | <0.02 | <0.02 | <0.02 | <0.02 | <0.02 | <0.02 |
| residual PCP (ppm) | 2.55 | 1.7 | 0.74 | 0.34 | 0.22 | 0.2 | 0.02 |

TABLE 7

EFFECT OF $Fe^{2+}/H_2O_2$ RATIO ON THE OXIDATION OF PENTACHLOROPHENOL

| Penta (ppm) | $H_2O_2$ (ppm) | $Fe^{2+}$ (ppm) | $H_2O_2$/Penta ratio | $Fe^{2+}$ as % (w/w) of $H_2O_2$ | Residual penta (ppm) |
|---|---|---|---|---|---|
| 57 | 1815 | 230.5 | 31.8 | 12.7 | 0.98 |
| 57 | 1815 | 172.4 | 31.8 | 9.5 | 0.97 |
| 57 | 1815 | 114.3 | 31.8 | 6.3 | 0.95 |
| 57 | 1815 | 90.8 | 31.8 | 5 | 0.88 |
| 57 | 1815 | 70.8 | 31.8 | 3.9 | 1.4 |
| 57 | 1815 | 52.6 | 31.8 | 2.9 | 4.36 |
| 57 | 1815 | 44.6 | 31.8 | 2.5 | 1.6 |
| 57 | 1815 | 33.3 | 31.8 | 1.8 | 2.3 |
| 57 | 1815 | 22.2 | 31.8 | 1.2 | 11.2 |
| 57 | 1815 | 11.1 | 31.8 | 0.6 | 40.8 |
| 57 | 1815 | 5.6 | 31.8 | 0.3 | 45.8 |

TABLE 8

EFFECT OF IRON CONCENTATION AND PEROXIDE/PHENOL RATIO ON THE OXIDATION OF PHENOL

| Expt. # | Phenol conc. (ppm) | Peroxide conc. (ppm) | $Fe^{2+}$ conc. (ppm) | Peroxide/phenol ratio | $Fe^{2+}$ as % (w/w) of $H_2O_2$ | Residual phenol (ppm) |
|---|---|---|---|---|---|---|
| 3 | 1000 | 3000 | 500 | 3:1 | 17 | 20 |
| 4 | 1000 | 3000 | 1000 | 3:1 | 33 | 20 |
| 7 | 1000 | 3000 | 112 | 3:1 | 3.7 | <0.02 |
| 8 | 1000 | 3000 | 45 | 3:1 | 1.5 | <0.02 |
| 9 | 1000 | 3000 | 28 | 3:1 | 0.9 | <0.02 |
| 10 | 1000 | 3000 | 14 | 3:1 | 0.5 | <0.02 |

TABLE 9

CHEMICAL OXYGEN DEMAND (COD)

| EXP. # | BEFORE OXIDATION * | AFTER OXIDATION | % REMOVAL | AFTER CARBON ADSORPTION | % REMOVAL |
|---|---|---|---|---|---|
| 1 | 1586 | 330 | 79.2 | 300 | 81.1 |
| 2 | 1832 | 335 | 81.7 | 310 | 83.1 |
| 3 | 3273 | 948 | 71 | 705 | 78.5 |
| 4 | 750 | 422 | 42.1 | 108 | 85.6 |

See Table 8 for the relative content of PCP and creosote.

TABLE 10

ADSORBABLE ORGANIC HALOGENS (AOX)

| EXP. # | DESCRIPTION @ | BEFORE OXIDATION | AFTER OXIDATION | AFTER CARBON COLUMN |
|---|---|---|---|---|
| 1 | 2 PCP, 1 CREOSOTE | 8000* | ND | ND |
| 2 | 1 PCP, 2 CREOSOTE | 2300* | ND | ND |

TABLE 10-continued

ADSORBABLE ORGANIC HALOGENS (AOX)

| EXP. # | DESCRIPTION @ | ADSORBABLE ORGANIC HALOGENS (AOX) (μG/l)* | | |
|---|---|---|---|---|
| | | BEFORE OXIDATION | AFTER OXIDATION | AFTER CARBON COLUMN |
| 3 | 0 PCP, 3 CREOSOTE | 260 | 160** | ND |

ND Not detected
+ DL = Detection limits: 150 ppb except * which is 2000 ppb
** Too close to the detection limit to be significant.
@ Numbers represent the number of charges of that particular preservative per day. For example: 3 PCP and 0 creosote, means, on that particular day, the plant treated three charges of poles with penta and no changes with creosote.

TABLE 11

EXPERIMENT #1
WOOD PRESERVING PHENOLICS

| Compounds | Before oxidation (ppb) | After oxidation (ppb) | After carbon treatment (ppb) |
|---|---|---|---|
| Phenol | 15,688 | 7 | 3 |
| Other phenols | 19,805 | 32 | 13 |
| Pentachlorophenol | 10,875 | 137 | 4 |
| Other chlorophenols | 1,030 | 7 | 6 |

TABLE 12

EXPERIMENT #2
WOOD PRESERVING PHENOLICS

| Compounds | Before oxidation (ppb) | After oxidation (ppb) | After carbon treatment (ppb) |
|---|---|---|---|
| Phenol | 37,228 | 17 | 3 |
| Other phenols | 54,906 | 40 | 12 |
| Pentachlorophenol | 3,538 | 57 | 26 |
| Other chlorophenols | 703 | 3 | 7 |

TABLE 13

EXPERIMENT #4
WOOD PRESERVING PHENOLICS

| Compounds | Before oxidation (ppb) | After oxidation (ppb) | After carbon treatment (ppb) |
|---|---|---|---|
| Phenol | 33,000 | 1.4 | 1.9 |
| Other phenols | 6,472 | N.D. | 1 |
| Pentachlorophenol | 340 | 25 | 4 |
| Other chlorophenols | 22 | N.D. | N.D. |

TABLE 14

EXPERIMENT #1
POLYNUCLEAR AROMATIC HYDROCARBONS (PAH'S)

| Compounds | Before oxidation (ppb) | After oxidation (ppb) | After carbon treatment (ppb) |
|---|---|---|---|
| Naphthalene | 320 | 9.8 | 0.28 |
| Other PAH's | 183 | 5.63 | 0.58 |

TABLE 15

EXPERIMENT #2
POLYNUCLEAR AROMATIC HYDROCARBONS (PAH'S)

| Compounds | Before oxidation (ppb) | After oxidation (ppb) | After carbon treatment (ppb) |
|---|---|---|---|
| Naphthalene | 2,600 | 51.0 | 6.60 |
| Other PAH's | 254 | 7.01 | 0.63 |

TABLE 16

EXPERIMENT #4
POLYNUCLEAR AROMATIC HYDROCARBONS (PAH'S)

| Compounds | Before oxidation (ppb) | After oxidation (ppb) | After carbon treatment (ppb) |
|---|---|---|---|
| Naphthalene | 30 | 0.90 | 0.06 |
| Other PAH's | 138 | 0.17 | 0.07 |

TABLE 17

RESULTS OF OXIDATION OF GROUNDWATER

| Compounds | Before oxidation (ppm) | After oxidation (ppm) |
|---|---|---|
| Phenols | 0.47 | <.0005 |
| Other phenols | 7.27 | <.0005 |
| Pentachlorophenol | 0.011 | <.0005 |
| Other chlorophenols | 0.0247 | <.0005 |
| Total PAH's | 4.3107 | <.00100 |

In accordance with the invention organic contaminants in water, particularly mixtures of polynuclear aromatic hydrocarbons, phenols and chlorinated phenols can be substantially removed by oxidation with destruction levels of such contaminants in excess of 99% and typically in the order of 99.9% for phenols and pentachlorophenols and 97 to 99% for polynuclear aromatic hydrocarbons.

The process is highly efficient showing reductions in COD between 77% and 88%. This high efficiency in destroying organic contaminants results in a four to eight-fold increase in the service life of activated carbon, which is a significant increase resulting in a significant cost saving. In addition, the destruction of adsorbable chlorinated organics (AOX) protects the carbon from being contaminated by these compounds and permits thermal regeneration of the carbon without concerns about production of chlorinated dioxins and furans.

We claim:

1. A process for removing pentachlorophenol from contaminated water comprising:

oxidizing the pentachlorophenol in the contaminated water with hydrogen peroxide in the presence of ferrous ions in a concentration of 5 to 7%, by weight, based on the weight of hydrogen peroxide at a weight ratio of hydrogen peroxide to COD, of contaminants, of at least 1.25:1 and an acid pH of about 3 to about 4, to produce an oxidized waste water.

2. A process according to claim 1, wherein said contaminated water further comprises phenols from wood preservatives.

3. A process according to claim 1, wherein said contaminated water further comprises chlorinated phenols.

4. A process according to claim 1, wherein said contaminated water is derived from a wood preservation treatment.

5. A process according to claim 1, wherein said oxidizing is at a temperature below 40° C.

6. A process according to claim 1, further including:

flowing the oxidized water through activated carbon to adsorb residual organic contaminants.

7. A process according to claim 6, wherein said contaminated water further comprises phenols and chlorinated phenols from wood preservatives.

8. A process for removing organic contaminants comprising pentachlorophenol from a contaminated water derived from a wood preservation treatment comprising:

i) oxidizing the organic contaminants comprising pentachlorophenol in the water with hydrogen peroxide in the presence of catalytic ferrous ions in a concentration of 5 to 7%, by weight, based on the weight of hydrogen peroxide, at an acid pH of 3 to 4 and a weight ratio of hydrogen peroxide to COD of said contaminants of at least 1.25:1, said contaminants consisting essentially of said pentachlorophenol, polynuclear aromatic hydrocarbons and wood preservative phenols, and ii) flowing the oxidized water from i) through activated carbon to adsorb residual organic contaminants.

9. A process according to claim 8, in which more than 99%, by weight of said phenols and pentachlorophenol and 97 to 99%, by weight of said polynuclear aromatic hydrocarbons in the contaminated water, are removed by oxidation in step i).

10. A process according to claim 9, wherein said activated carbon is periodically replaced, and wherein the replacement rate is four to eight times less frequent than the replacement rate when the organic contaminants in the same contaminated water are removed by adsorption on activated carbon without the oxidizing of step i).

11. A process according to claim 9, wherein said oxidizing is at a temperature below 40° C.

* * * * *